United States Patent [19]

Church et al.

[11] Patent Number: 4,464,560
[45] Date of Patent: Aug. 7, 1984

[54] ARC WELDING GUN WITH GAS DIFFUSER AND EXTERNAL COOLING CONDUIT

[75] Inventors: John G. Church, Thornhill; Emerson G. Malone, Rexdale, both of Canada

[73] Assignee: T.I.M.E. Welding Gas Corporation, Toronto, Canada

[21] Appl. No.: 349,141

[22] Filed: Feb. 16, 1982

[51] Int. Cl.³ .............................................. B23K 9/16
[52] U.S. Cl. ................. 219/137.42; 219/74; 219/137.62
[58] Field of Search .................. 219/137.42, 137.62, 219/137.31, 74

[56] References Cited

U.S. PATENT DOCUMENTS

| | | | |
|---|---|---|---|
| 2,686,860 | 8/1954 | Buck et al. | 219/74 |
| 3,047,714 | 7/1962 | Wepfer | 219/137.62 |
| 3,469,070 | 9/1969 | Bernard et al. | 219/137.31 |

Primary Examiner—Roy N. Envall, Jr.
Assistant Examiner—Alfred S. Keve
Attorney, Agent, or Firm—Cullen, Sloman, Cantor, Grauer, Scott and Rutherford

[57] ABSTRACT

A welding wire gun operable in the high temperature environment of a high current density welding system. The welding gun includes a tubular member through which welding wire and shielding gas are adapted to pass. A gas diffuser member is mounted upon one end of the tubular member and, in turn, supports a welding tip therein such that the end of the welding tip projects beyond the diffuser in the direction of the joint to be welded. Additionally, the welding gun is constructed to provide for flowing of a coolant material around the tubular member proximate the diffuser member for maintaining the welding tip below its melting or distortion temperature. A tubular nozzle member is supported at one end from the diffuser member and extends beyond both the diffuser member and the welding tip in such a way as to define an annular shielding gas chamber about the diffuser and welding tip. Gas passages formed through the diffuser communicate with the annular gas chamber and are angularly oriented with the central axis of the diffuser and welding tip so as to maximize the velocity and minimize turbulence of the gas flow through the gun to thereby maintain a high energy shielding gas envelope around the welding wire and weld puddle.

8 Claims, 6 Drawing Figures

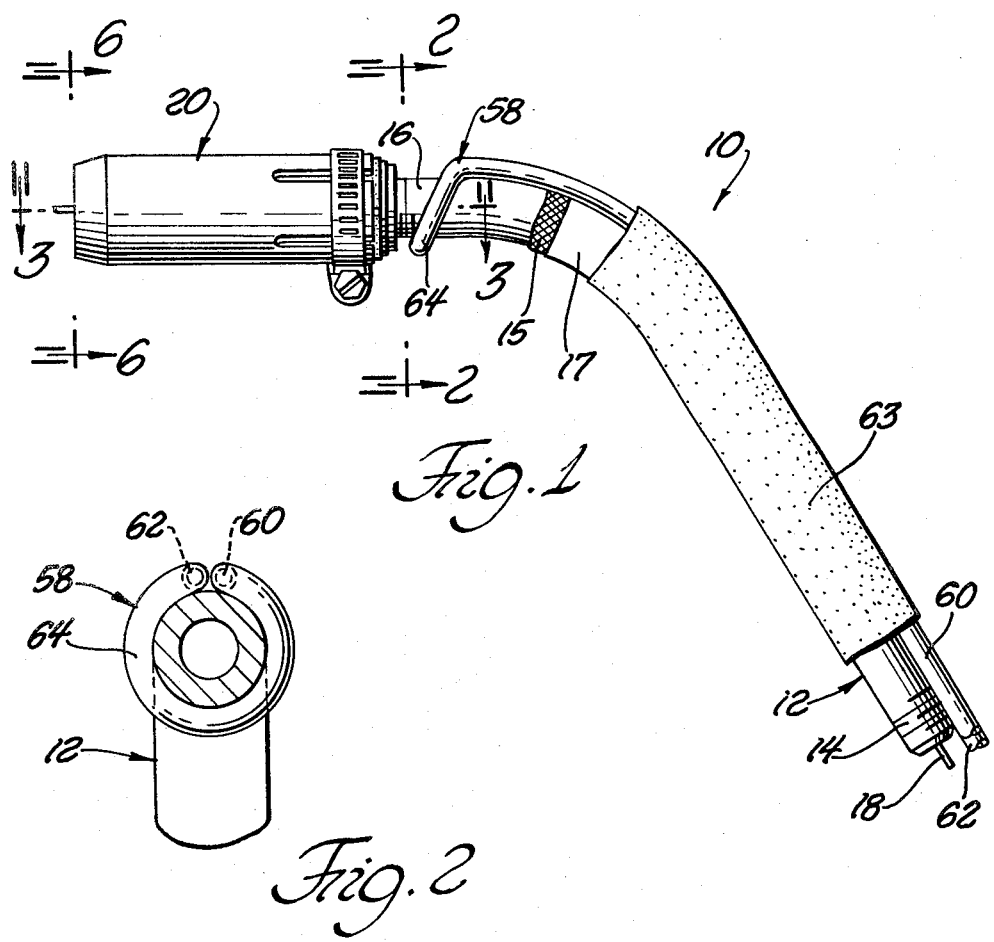
Fig. 1
Fig. 2
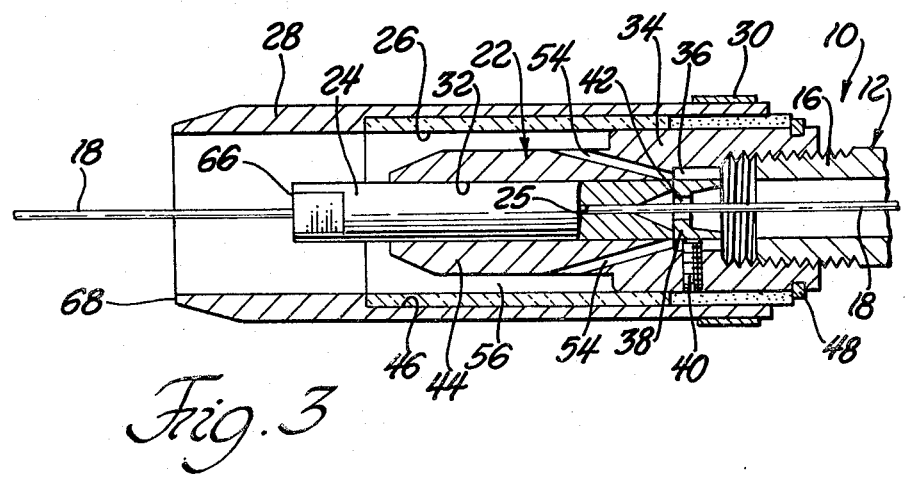
Fig. 3

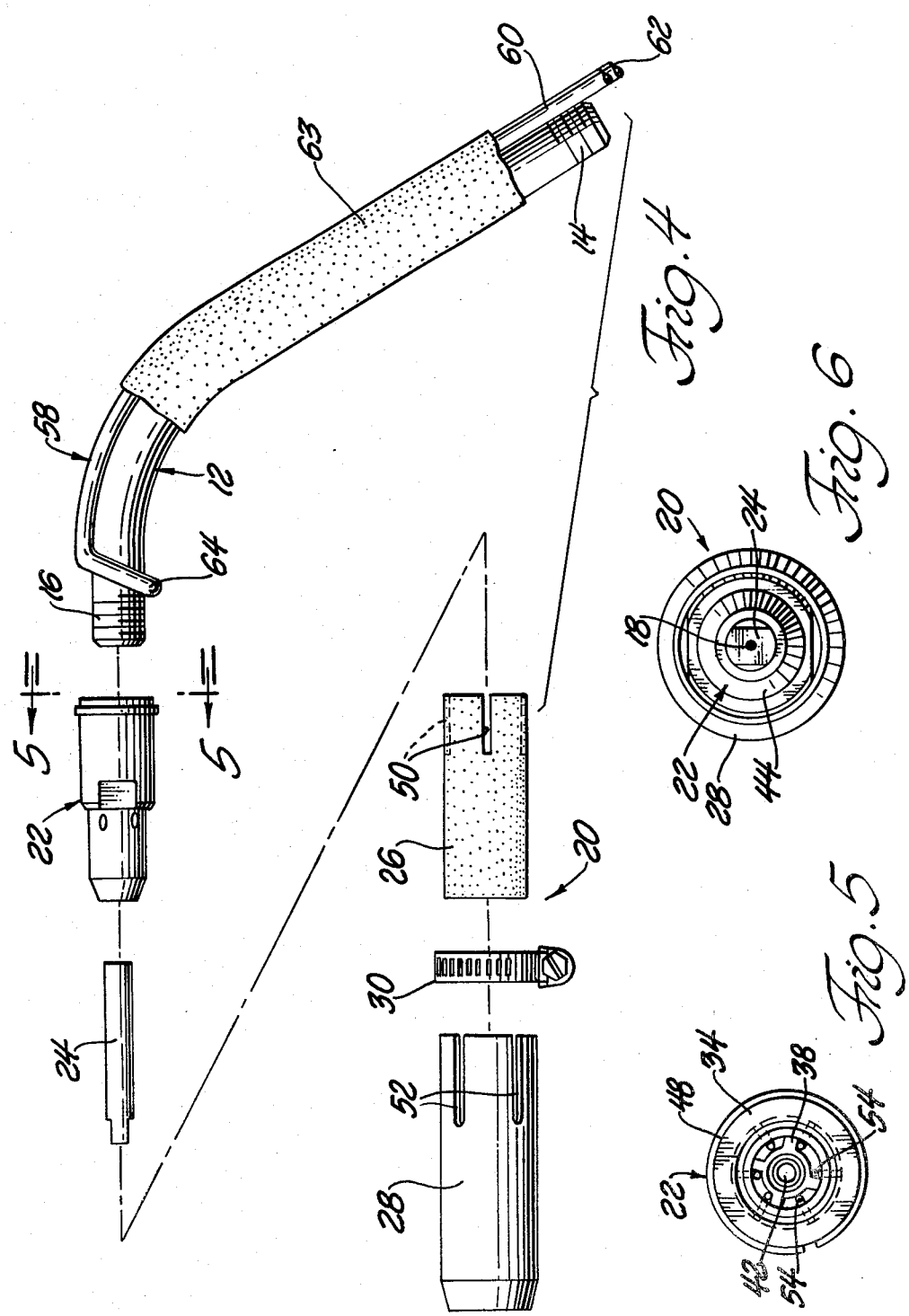

ARC WELDING GUN WITH GAS DIFFUSER AND EXTERNAL COOLING CONDUIT

TECHNICAL FIELD

The subject matter of the present invention relates to a welding wire gun and, in particular, a gun of a type able to operate in the high temperature environment of a high current density welding system.

Current density is determined by dividing the amperage to which the welding wire is subjected by the cross sectional area of the welding wire. Heretofore welding wire guns have been designed to operate in the range of current densities of 130,000 amperes per square inch. Recently a new welding system has been developed which operates in the range of current densities of 450,000 amperes per square inch. Such new high density welding system results in greatly improved welding joints and is described in copending application Ser. No. 235,220 Church filed Feb. 17, 1981, now abandoned. However, previously known welding guns have proven unsatisfactory when subjected to the temperatures associated with the high current density welding system as described in the aforementioned copending application.

The problem with conventional welding guns operating at high current densities is severalfold. First, when welding at high current densities, the welding temperatures are such that the welding wire, weld puddle and shielding gas plasma transmit sufficiently high temperatures to the welding gun tip as to cause the tip to distort and even melt thereby preventing further movement of the welding wire through the gun. Next, and particularly when welding with high current densities, a conically shaped and extremely high temperature plasma is formed between the tip of the welding wire and the weld puddle and unless the force of the shielding gas flowing through the welding gun is sufficiently high, the welding temperatures tend to divert or displace the shielding gas away from the hot welding wire and to thus destabilize the welding plasma.

Thus, the present invention is directed to providing a welding gun which includes improved means for flowing shielding gas through the welding gun both to contribute to the cooling of the welding tip as well as to increase the velocity of air flow though the gun to enhance the welding gas shield around the welding wire and weld puddle. The improved welding gun also includes a unique water circulating means for cooling the gun components such as the shielding gas diffuser and welding tip which are subjected to high ambient operating temperatures.

DESCRIPTION OF PRIOR ART

Insofar as Applicants are aware, the most relevant prior art is shown in the following U.S. Pat. Nos. 3,283,121—Bernard et al, 3,469,070—Bernard et al, 3,576,423—Bernard et al, 3,676,640—Bernard et al.

U.S. Pat. No. 3,283,121—Bernard et al. discloses a welding gun incorporating water cooling means directly within the welding head such that a portion of the head must be cut away and replaced if the water cooling chamber becomes clogged. Thus, flowing cooling water directly into the head makes the head costly both to manufacture and to repair. The '121 patent also shows shielding gas passages disposed parallel to the head axis and an axially spaced baffle to protect the outlet ends of the passages from being plugged by spattering metal from the weld joint.

The '423 and '640 patents are divisional patents from '070 Bernard et al; thus, the disclosures of all three patents are the same. Accordingly, reference will be made only to the '070 patent. The '070 patent does not include a water cooling arrangement and, in fact, the patentees state, contrary to Applicants' results, that a circulating water feature was inadequate with a high current range welding gun. Thus, the patentees apparently abandoned the use of a water cooling system as disclosed in their earlier '121 patent. Like Applicants, the '070 patent discloses gas diffuser passages inclined to the welding head axis. However, the patent does not recognize the criticality of the passage angle and size. The patent discloses a passages angle of 30° which Applicants have found too steep and which dissipates too much of the shielding gas flow energy through turbulence. Likewise, the patent does not recognize the importance of the cross sectional size of the gas passage to ensuring an adequate quantity of gas flow.

DISCLOSURE OF THE INVENTION

It is a first object of the present invention to provide a new and improved welding gun cooling system which insures that the welding tip and other parts of the gun are maintained below their melting or distortion temperatures. It is acknowledged that water cooled welding guns have been known prior to the subject invention. However, such water cooled welding guns as heretofore known are either inadequate to maintain the welding tip below its melting or distortion temperature when used with a high current density welding system or have been too costly to build and maintain.

The next object of the subject invention is to provide means for substantially improving the quality and quantity of airflow through the welding gun so as to enhance the shielding gas envelope which protectively surrounds the welding wire and weld puddle.

Specifically with respect to the welding gun cooling system, means is provided for bringing the coolant sufficiently close to the thermally conductively-related welding gun components so that the heat to which the welding tip is subjected is dissipated in a manner to prevent distortion or melting of the welding wire tip. This result is achieved in a manner which avoids the necessity of modifying the welding tip and diffuser portion of the welding gun to directly incorporate cooling passages.

The welding gun is of the type which includes a metal tubular member through which welding wire and shielding gas are adapted to pass. A metal gas diffuser member is mounted upon one end of the metallic tube member and, in turn, supports a welding tip therewithin such that the end of the welding tip projects longitudinally beyond the diffuser in the direction of the joint to be welded. The diffuser member is preferably of an integral metal construction and is mechanically interconnected to the gas and welding wire supplying tube such that the tube and welding tip are in a thermally conductive relationship. These general features are shown in the aforementioned '070 Bernard et al patent. However, means is additionally provided for flowing a coolant material substantially around the tube member proximate the diffuser member which thereby maintains the welding tip below its melting and/or distortion temperature.

The welding gun also includes a tubular nozzle member which is supported at one end from the diffuser member and extends longitudinally beyond both the diffuser member and the welding tip and in such a way as to define an annular shielding gas chamber about the diffuser and welding tip as also broadly shown in the '070 patent. Heretofore, the flow of shielding gas through the diffuser has been such as to dissipate much of the gas flow energy by creating non-laminar or turbulent flow through the welding gun, due to striking a baffle ('121 patent) or by impinging at too great an angle against an interior welding head wall ('070 patent), as a result of which the shielding gas envelope has insufficient energy or strength to closely maintain itself around the welding wire and weld puddle and which problem is increased with increased or high current densities.

In the present invention, the gas passages formed through the diffuser and which communicate with the annular gas chamber are angularly oriented with the central axis of the diffuser and welding tip so as to maximize the velocity and minimize turbulence of the gas flow though the gun and to thereby maintain a high energy shielding gas envelope around the welding wire and weld puddle.

The invention will be more clearly understood from a perusal of the drawings and the following detailed description.

BRIEF DESCRIPTION OF DRAWINGS

FIG. 1 is a partially broken away side elevation of the welding gun;

FIG. 2 is a cross sectional view along line 2—2 of FIG. 1;

FIG. 3 is a sectional view along line 3—3 of FIG. 1;

FIG. 4 is an exploded view of the welding gun with the various components disassembled;

FIG. 5 is a view along line 5—5 of FIG. 4; and

FIG. 6 is a view along line 6—6 of FIG. 1.

BEST MODE FOR CARRYING OUT THE INVENTION

Reference is made to FIG. 1 wherein a welding gun is indicated generally at 10. As best seen in FIGS. 1 and 4, welding gun 10 includes an angled, rigid, tubular member 12 having threaded end portions 14 and 16. Typically, tubular member 12 is made of copper and is adapted to conduct current to welding tip 24. An operator handle, not shown, is adapted to be supported upon tubular member 12 whereby a gun operator can manipulate the welding gun 10. To prevent current from reaching the operator, an insulating sleeve 15 covers member 12 and may, in turn, be covered by a metal, e.g. brass, sleeve 17 to which the operator handle may be secured.

A suitable flexible conduit, not shown, is adapted to be coupled to threaded end 14 of tubular member 12 and through which flexible conduit welding wire 18 and suitable shielding gas are provided.

A welding gun head assembly is indicated generally at 20 and is threadably mounted to the threaded end 16 of tubular member 12. The nonsectioned components of the welding head assembly are best seen in the exploded view of FIG. 4 and generally include a shielding gas diffuser 22, a welding tip 24, a thermal insulator shield 26, a nozzle 28, and a retaining clamp 30. While the metal materials may be varied, typically diffuser 22 is machined from a solid piece of brass while tip 24 and nozzle 28 are respectively formed from copper rod and tubing. Insulator shield 26 may be formed of a molded fiberglass or other suitable, thermally insulative material. Retaining clamp 30 is of a conventional thin strip steel material.

As best seen in FIG. 3, the shielding gas diffuser 22 includes a central passage 32 extending throughout the longitudinal extent thereof. Diffuser 22 includes an enlarged end 34 having an internally threaded counterbored portion 36 coaxially related to central passage or opening 32.

As also seen in FIG. 5, a radially slotted space element 38 is adapted to seat within the diffuser conterbored portion 36 and be retained therein through a locking screw element 40 threadably disposed within a radial opening formed through the enlarged diffuser portion 34. Spacer 38 includes a coaxial opening 42 adapted to permit welding wire 18 to pass centrally through the spacer.

Diffuser 22 is adapted to be threadably mounted upon end 16 of tubular member 12 with the degree of inward threading of the tubular member relative to the diffuser being limited by abutment of the end of the tubular member against spacer 38. Thus, counterbored chamber 36 of the diffuser is in open communication with tubular member 12 such that shielding gas may flow thereinto.

Diffuser 22 includes a welding tip supporting portion 44 of reduced diameter relative to enlarged diffuser portion 34. Welding tip 24 is adapted to be removably supported within central passage 32 of the diffuser with its degree of insertion within the diffuser also being limited by abutment of its innermost end against spacer 38. Welding tip 24 includes a wire receiving bore or passage 25 having a diameter only slightly larger than the wire, e.g. 0.035 inch, adapted to be fed therethrough. While the wire receiving bores or passages of the other welding gun components are sufficiently large to accommodate a wide range of welding wire sizes, welding tip 24 must be changed with each welding wire size change in order that the tip bore or passage 25 closely support and make electrical contact with welding wire 18.

Hollow nozzle member 28 includes an internal counterbore 46 adaped to slidably receive thermal insulating sleeve 26. The counterbore 46 of nozzle 28 insures that the internal bore diameters of the nozzle and the insulator sleeve are essentially equal to provide a smooth surface over which the shielding gas flows as it passes through the nozzle.

A stop ring 48 is mounted in a suitable circumferential groove in the enlarged portion 34 of diffuser 22 and is adapted to limit the axial movement of the nozzle and insulator sleeve in the direction of tubular member 12.

The inner ends of insulator sleeve 26 and nozzle 28 include respective slots 50 and 52 to impart radial flexibility thereto so that clamping ring 30 can be circumferentially disposed thereabout to clampingly retain the nozzle and insulating sleeve upon diffuser 22.

At this point it is well to reemphasize that in a high density welding system such as shown and described in copending application Ser. No. 235,220 Church and wherein welding densities in the range of 450,000 amperes per square inch may be utilized, the weld puddle existing in the workpiece and fed by welding wire 18 has been estimated to have a temperature of several thousand degrees Fahrenheit. At the same time, the shielding gas plasma surrounding the weld puddle and the feeding tip of the welding wire 18 may be in the temperature range of 12,000° to 20,000° F. Thus, that portion of the welding gun disposed proximate the weld puddle can be exposed to extremely high temperatures. Such high weld puddle and gas plasma temperatures have created at least two problems with peviously known welding guns. First, the plastic or softened end of the welding wire 18 closest to the weld puddle will conduct and the gas plasma will reflect sufficient heat to the welding tip 24 to cause the tip to either distort in such a way as to bind the welding wire and prevent its flow through the welding gun or to melt the welding tip, likewise preventing the flow of welding wire therethrough. The second problem created by the high current dennsity welding environment is that the heat energy contained both in the weld puddle and the shielding gas plasma tends to dissipate or deflect the shielding gas as it flows from the welding gun leaving critical areas unshielded and destabilizing the welding arc and plasma.

Reference will first be made to the improved means for insuring a non-turbulent flow of the shielding gas through the welding gun whereby the velocity of such shielding gas is maximized to insure a strong shielding gas envelope around the welding wire, weld puddle, and plasma.

Diffuser 22 includes a plurality of gas passages 54 drilled through body portions 34 and 44. Passages 54 allow the flow of shielding gas from tubular member 12 to annular nozzle gas chamber 56. As already noted, welding gun head 20 has a longitudinal axis around which components 22, 24, 26, 28, and 30 are concentrically disposed. Heretofore, gas passages 54 have been formed or drilled at angles to the longitudinal axis of from 30° to 90°. As a result of these relatively steep gas passage angles, the shielding gas issuing therefrom has impacted against the nozzle bore or inner walls in a manner disrupting laminar or smooth gas flow and, instead, creating turbulence. Thus, much of the shielding gas flow energy is dissipated whereby the gas issuing from the welding gun is relatively amorphous or lacking definition and is, therefore, easily deflectable by the high temperatures generated in high current density welding.

Applicants have discovered that the angularity of gas passages 54 relative to the longitudinal axis of head 20 is critical in providing smooth shielding gas flow through the welding gun so as to provide a strong and coherent gas envelope surrounding the weldiing arc and weld puddle. It is also believed that such improved gas envelope helps to stabilize both the welding arc and the gas plasma between the weld puddle and the welding wire tip. It has been found that the angles of gas passages 54 should be in the range of 10° to 20° relative to the longitudinal axis of head 20 with 15° being a preferred angle.

As pointed out in the prior art, the problem with parallel or 0° gas passages is that the exit ends of such passages are subject to being plugged by metal splattering from the weld joint. The use of a baffle between the gas passage exits and the nozzle tip to protect from metal splattering creates turbulence in the emerging gas streams, dissipating gas flow energy thereby weakening the shielding gas envelope. On the other hand, the very low angle impingement by the individual shielding gas streams against the inner nozzle wall provides essentially laminar gas flow and which streams circumferentially merge or blend to provide a generally coherent and annular gas envelope issuing from nozzle 28.

Heretofore it appears also to have been conventional practice to form gas passages with a diameter of not more than 1/16 inch. Applicants have found a 25% increase in passage diameter to 5/64 inch combined with the already described smoother gas flow due to the critical passage angularity enhances the quality and effectiveness of the gas envelope or shield. With the gas passages 54 being disposed in the 10° to 20° range relative to the welding head axis and having diameters of 5/64 inch, the rate of gas flow though the gun is in the range of 30 to 35 cubic feed per hour (CFH).

It is to be appreciated that the improved gas flow as described also contributes to enhanced cooling of the welding gun components, a further important aspect of which will now be described.

As already noted and which is of a critical nature in high current density welding, the welding gun components and particularly the welding tip, are subject to extremely high temperatures which, if not ameliorated, will destroy or otherwise cause the welding gun to malfunction. As already noted, water cooled welding guns have been used in the past in an effort to reduce gun temperatures. Such water cooled guns either have been too bulky or too costly to build and maintain and, thus, have been impractical in high current density applications in reducing welding tip temperatures.

Referring to FIGS. 1, 2, and 4, it will be seen that a tubular metal water conduit 58 is provided and is suitably conductively connected to tubular gun member 12 as by silver soldering. More specifically, conduit 58 includes water inlet and outlet legs 60 and 62 and an end loop 64 disposed as close as possible to diffuser 22. It has been found to be satisfactory to solder coolant conduit 58 to tube member 12 only in the area of loop 64 although more extensive soldering can be done if desired. With conduit 58 being in proximity with the diffuser and conductively related through tubular member 12 to diffuser 22 and welding tip 24, water flow through the conduit dissipates the heat from the welding tip at a rate which maintains the tip below its melting or distortion temperature thereby assuring the continuous movement of welding wire 18 through the tip and to the weld puddle.

Should it ever become necessary to remove coolant conduit 58, it is a simple matter to melt the solder connection, remove and replace the conduit by resoldering.

If desired, a suitable sheath 63 may be disposed about tubular member 12 to enclose water conduit 58.

With the orientation of cooling conduit 58 as described, it is found that circulating water at the rate of 1½ gallons per minute provides adequate heat dissipation away from welding tip 24 to insure against distortion or melting of the tip. It is to be understood that water flow through conduit 58 may be adjusted as needed to accommodate different current densities.

Particularly with respect to the earlier referenced high current density welding system of Church (U.S. Ser. No. 235,220), it is desirable to recess end 66 of welding tip 24 within nozzle 28. The purpose of such recessing is to facilitate preheating of welding wire 18 prior to entry into the welding arc. The deeper the recessing within the nozzle, the greater length of wire exposed, the greater resistance to current flow and the greater preheating of the wire. With prior welding systems and welding guns, the maximum practical recessing without disrupting metal flow into the weld joint has been approximately 0.250 inch from the nozzle end. With the subject high current density welding gun, Applicants have been able to recess tip end 66 up to 0.750 inch from end 68 of nozzle 28. As an example, with 0.035 inch welding wire tip end 66 can be recessed in the range of 0.500 to 0.560 inch. As indicated by the following table, the recess distance is increased with increased diameter welding wire:

| Wire Size (in.) | Recess Distance (in.) |
| --- | --- |
| .030 | .300 |
| .035 | .560 |
| .045 | .600 |
| .052 | .750 |

It is contemplated that other modifications of the inventin are possible within the intended scope of the invention as set forth in the hereinafter appended claims.

What is claimed is:

1. A welding gun of the type having a rigid metal tubular member through which a welding wire element and shielding gas are adapted to pass, a metal gas diffuser member removably mounted upon one end of said tube member and having a major longitudinal axis, said diffuser member including a first tubular portion including a gas and welding wire receiving chamber in open communication with said tube member and which passage is coaxial with said major axis, a second tubular portion of a lesser diameter than said first portion and having a welding wire tip supporting opening therethrough and coaxially communicating with the passage in said first portion, a welding wire tip member removably mounted within the opening in the second tubular portion of the diffuser member and having an end projecting longitudinally beyond said second tubular portion, a welding wire opening formed coaxially through said welding wire tip member, a tubular nozzle supported at one end upon the first tubular portion of the diffuser member and having an open end projecting longitudinally beyond said welding tip, said nozzle co-acting with the second tubular portion of the diffuser member to define an annular gas chamber coaxial with the major axis of said diffuser member, a plurality of axially inclined passages formed in the tubular portions of the diffuser member to communicate the gas chamber of the first tubular diffuser portion with the annular gas chamber, and means for cooling said tubular member, said diffuser and said welding tip, the improvement comprising:

said passages being inclined to said major diffuser axis from 10° to 20°.

2. A welding gun as set forth in claim 1 wherein said passages are inclined to said major diffuser axis at an angle of 15°.

3. A welding gun as set forth in claim 1 wherein each passage has a diameter of at least 5/64 inch.

4. A welding gun as set forth in claim 1 wherein the cooling means includes a water conduit thermally connected exteriorly of said tubular member and including a portion proximate said diffuser.

5. A welding gun as set forth in claim 4 wherein the proximate portion of said water conduit substantially circumferentially surrounds said tubular member.

6. A welding gun as set forth in claim 5 wherein the water conduit is thermally conductively connected to the tubular member in the area of the circumferentially extending portion of said water conduit.

7. A welding gun as set forth in claim 1 wherein the projecting end of said welding tip is recessed longitudinally from the open end of said nozzle from 0.30 to 0.75 inch.

8. A welding gun as set forth in claim 7 wherein said water cooling means includes a water cooling conduit mounted in a thermally conductive relationship to the exterior of said tubular member and including a portion disposed proximate said diffuser.

* * * * *